United States Patent
Schøning et al.

(10) Patent No.: US 9,265,092 B2
(45) Date of Patent: Feb. 16, 2016

(54) HEAT TRANSMISSION SYSTEM BASED ON ELECTROMAGNETIC RADIATION AND A FOIL FOR USE IN A TRANSMISSION SYSTEM

(75) Inventors: Anita Schøning, Hellerup (DK); Lars Schøning, Hellerup (DK)

(73) Assignee: Aps af 28/8, Skodsborg (DK)

( * ) Notice: Subject to any disclaimer, the term of this patent is extended or adjusted under 35 U.S.C. 154(b) by 408 days.

(21) Appl. No.: 12/452,178

(22) PCT Filed: Jun. 27, 2008

(86) PCT No.: PCT/DK2008/000241
§ 371 (c)(1),
(2), (4) Date: Mar. 1, 2010

(87) PCT Pub. No.: WO2009/000272
PCT Pub. Date: Dec. 31, 2008

(65) Prior Publication Data
US 2010/0200572 A1    Aug. 12, 2010

(30) Foreign Application Priority Data
Jun. 27, 2007    (DK) ................................ 2007 00924

(51) Int. Cl.
*H05B 6/02* (2006.01)
*H05B 3/00* (2006.01)
*A47J 36/02* (2006.01)

(52) U.S. Cl.
CPC ............. *H05B 3/0076* (2013.01); *A47J 36/022* (2013.01); *B65D 2581/3427* (2013.01); *B65D 2581/3472* (2013.01); *H05B 2203/032* (2013.01)

(58) Field of Classification Search
CPC ............. H05B 6/02; H05B 6/36; H05B 6/24; H05B 6/362; H05B 6/44
USPC ................. 219/647, 678, 702, 728, 729, 730
See application file for complete search history.

(56) References Cited

U.S. PATENT DOCUMENTS

| | | | | |
|---|---|---|---|---|
| 2,977,269 A | * | 3/1961 | Nerwick | 264/102 |
| 3,861,931 A | * | 1/1975 | Taylor | 252/582 |
| 3,984,592 A | * | 10/1976 | Stillwagon | 427/209 |
| 4,190,757 A | * | 2/1980 | Turpin et al. | 219/730 |

(Continued)

FOREIGN PATENT DOCUMENTS

GB    2425701    11/2006

*Primary Examiner* — Charles Garber
*Assistant Examiner* — Long Le
(74) *Attorney, Agent, or Firm* — Saul Ewing LLP; Brian R. Landry

(57) ABSTRACT

The invention relates to a heat transmission system based on electromagnetic radiation, which heat transmission system comprises an oven cavity and a foil with at least two layers, said at least two layers of the foil comprising a radiation-absorbing layer, wherein the wavelength spectre of the electromagnetic radiation of the radiation-absorbing layer and wavelength spectre of the electromagnetic radiation of the oven cavity are attuned to each other. The invention also relates to a foil for use in a heat transmission system, said foil comprising at least two layers, and wherein the wavelength spectre of the electromagnetic radiation of the foil is attuned to that of a heat source, eg the wavelength spectre of the electromagnetic radiation of an oven. The foil may be provided with a radiation-absorbing surface that may be configured both as a flexible foil and as an inflexible foil that may be of either metal or of a polymer, paper, cardboard or other materials that are based on wood.

20 Claims, 7 Drawing Sheets

(56) References Cited

U.S. PATENT DOCUMENTS

| | | | |
|---|---|---|---|
| 4,656,325 A * | 4/1987 | Keefer | 219/728 |
| 4,876,423 A * | 10/1989 | Tighe et al. | 219/759 |
| 4,983,798 A * | 1/1991 | Eckler et al. | 219/730 |
| 5,258,596 A * | 11/1993 | Fabish et al. | 219/728 |
| 5,285,040 A * | 2/1994 | Brandberg et al. | 219/745 |
| 5,300,746 A * | 4/1994 | Walters et al. | 219/745 |
| 5,698,306 A * | 12/1997 | Prosise et al. | 428/312.8 |
| 6,054,697 A * | 4/2000 | Woodward et al. | 219/729 |
| 6,104,004 A * | 8/2000 | Ragland et al. | 219/405 |
| 2003/0141298 A1* | 7/2003 | Lee et al. | 219/741 |
| 2005/0184065 A1* | 8/2005 | Tucker et al. | 219/730 |
| 2006/0049190 A1* | 3/2006 | Middleton et al. | 219/730 |
| 2006/0182948 A1* | 8/2006 | Watase et al. | 428/323 |
| 2006/0193952 A1* | 8/2006 | Penttinen et al. | 426/106 |
| 2007/0251942 A1* | 11/2007 | Cole et al. | 219/730 |

* cited by examiner

| SAMPLE | T OVEN °C | T ALU FOIL, START s | T ALU FOIL, MAX °C | T SAMPLE, MAX s | T SAMPLE, MAX °C | ΔT, °C | E, % |
|---|---|---|---|---|---|---|---|
| ACRYL STYRENE COPOLYMER | 400 | 18 | 104 | 81 | 143 | 39 | 37,50 |
| Al-FLAKES | 400 | 11 | 104 | 74 | 197 | 93 | 89,42 |
| CaCO$_3$ + SiO$_2$ | 400 | 12 | 99 | 90 | 160 | 61 | 61,62 |
| CARBON BLACK | 400 | 15 | 104 | 43 | 216 | 112 | 107,69 |
| CARBON BLACK + SiO$_2$ | 400 | 13 | 104 | 62 | 224 | 120 | 115,38 |
| Na$_4$SiO$_4$ | 400 | 13 | 104 | 126 | 149 | 45 | 43,27 |
| Si | 400 | 8 | 99 | 43 | 169 | 70 | 70,71 |
| TiO$_2$ | 400 | 11 | 99 | 39 | 154 | 55 | 55,56 |

FIG. 3

| SAMPLE | | THICKNESS μm | | T OVEN °C | T ALU FOIL, START s | T ALU FOIL, MAX °C | T SAMPLE, MAX s | T SAMPLE max, °C | ΔT, °C | E, % |
|---|---|---|---|---|---|---|---|---|---|---|
| BOTTOM LAYER | TOP LAYER | BOTTOM | TOP | | | | | | | |
| Al-FLAKES | TiO2 | 6 | 6 | 400 | 13 | 104 | 41 | 204 | 100 | 96,15 |
| CARBON BLACK | Al-FLAKES | 6 | 6 | 400 | 11 | 104 | 45 | 199 | 95 | 91,35 |
| TiO2 | Al-FLAKES | 6 | 6 | 400 | 11 | 99 | 38 | 199 | 100 | 101,01 |
| CARBON BLACK | TiO2 | 6 | 6 | 400 | 17 | 104 | 55 | >232 | >128 | >123,08 |
| CARBON BLACK + SiO2 | TiO2 | 6 | 6 | 400 | 13 | 104 | 120 | 232 | 128 | 123,08 |
| CARBON BLACK | Si | 6 | 12 | 400 | 9 | 99 | 42 | 216 | 117 | 118,18 |

HEAT TRANSMISSION SYSTEM BASED ON ELECTROMAGNETIC RADIATION AND A FOIL FOR USE IN A TRANSMISSION SYSTEM

BACKGROUND OF THE INVENTION

1. Field of the Invention

The invention relates to a heat transmission system based on electromagnetic radiation, the heat transmission system including an oven cavity and a foil with at least two layers. The invention also relates to a foil for use in a heat transmission system.

2. The Prior Art

From GB2425 701 an oven for analytic devices is known. The oven includes a radiant energy source and a couple of reflectors arranged to reflect radiant electromagnetic energy toward an inner surface of an insert. The insert includes a body fabricated from an efficient heat conductive material such as for example aluminium or copper. The insert includes an inner surface and an outer surface. In an embodiment the insert is aluminium, and the inner surface is anodized to form a dark, and preferably black, surface. The inner surface is configured to absorb the radiant electromagnetic energy emitted by the radiant source and convert it into heat. The heat is conducted through the wall between the inner surface and the outer surface.

It is the object of the invention to provide a heat transmission system based on electromagnetic radiation and a foil or coating, e.g., for applying aluminium packaging or aluminium foils for primary use within the foodstuffs industry with a view to obtaining surfaces that have unique properties in respect of quick heating via IR radiation/radiant heat from hot surfaces in ovens. This means that the surface on the foil is made of materials that are to the widest extent possible capable of absorbing the radiation from the internal part of the surface.

SUMMARY OF THE INVENTION

Therefore, the novel heat transmission system is configured such that the wavelength of an IR-absorbing surface is adapted to or matches the IR-radiation that is emitted from a heat source, e.g., the internal surface of an oven. For an oven applied with enamel, which is among the most frequently used materials for coating oven cavities, a coating is thus concerned that emits IR radiation with the highest intensity within the range 8,000-10,000 nanometres. The novel IR surface is thus to be capable of primarily absorbing radiation of the same wavelength if the heating via radiant heat is to be performed quickly and efficiently.

Since the radiant heat constitutes a considerable part of the heat transfer and, already at an oven-wall temperature of 200° C., constitutes more than 60% and hence makes a larger contribution than the convection heat, it is of the utmost interest to adapt the Al surface on the packaging for absorbing the emitted IR radiation from the oven wall.

If an untreated surface of Al is considered, the contribution from the radiant heat constitutes only about 7%.

The applied coating may be applied via printing technology and consists of minerals that are not black, but appear light and visually resemble aluminium. The minerals have the property that they are selected in particular for their ability to absorb the IR radiation in the given wavelength that characterises the radiation from the hot oven wall. By applying the coating as a sandwich layer, where a first layer is configured for absorbing the IR-radiation and a second layer is configured for reflecting the radiation of heat emitted from a heated element wrapped in the foil, the heat from the element is thus reflected back to the element.

The reason for this is to be found in the so-called internal reflection between the bottom layer and the top layer. By combining optimally matching coatings with a top layer that improves the internal reflection, higher temperatures have thus been measured on the inside of the foil than can be obtained via black surfaces (black body).

The need for the production of finished foodstuff products in aluminium packaging for being heated in radiation and convection ovens is ever increasing. The reasons for this are the desire to spend less time on cooking and to save energy.

The packing of foodstuffs in alu-foil followed by a heating procedure in a conventional oven prolongs the preparation time due to the good reflective properties of the aluminium material to IR heat radiation. It has been attempted to produce both a dull and a glossy side on, e.g., the aluminium foil without having thereby improved the heat transmission properties significantly. This is not surprising from a theoretical point of view either.

As regards the total heat transmission, the complex of problems associated with the heating of foodstuffs in heat-resistant packagings can be calculated as the sum of convection and IR heat radiation. FIG. 1 is a graph showing the heat transmission as a function of the temperature of the oven. The figure shows that at $T_{oven}=200°$ C. heat radiation on a black element will dominate the total heat transmission by about 66%. This is not the case with the heat radiation on an alu-foil. Here heat radiation constitutes only about 7% of the total heat transmission.

From FIG. 1 it will appear that, at $T_{oven}=200°$ C., heat radiation on a black element will dominate the total heat transmission by about 66%. This is not the case with the heat radiation on an alu-foil. Here only about 7% of the total heat transmission is due to heat radiation.

For several years, it has been known that graphite applied with ia alu-foil is be an extremely efficient absorber of IR radiation, and over the years several attempts have been made within this field serving the purpose of using that idea to advantage. Thus the issue is to utilise the effect which is known from the black body that absorbs IR radiation 100%, Thus, U.S. Pat. No. 4,220,134 describes the use of "black Teflon on an aluminium surface for ensuring the absorption of IR heat radiation". U.S. Patent Application Publication 2006/0153952 A1 (Aromabag and aromafoil made of aluminium) also uses a black surface to advantage for optimally transferring radiant heat to an aluminium surface. For foodstuff uses black surfaces on aluminium foil are not particularly attractive from an aesthetical point of view, which is most likely the reason why foils of this kind have not found use for domestic purposes.

The present invention takes its starting point in surfaces that do not appear black and do not impart an appearance to the surface that could be perceived as unaesthetic by the foodstuff industry, while at the same time it possesses properties that are comparable to graphite or better; i.e., a very high emissivity (radiation measure) which is as close to the black body as possible, where the radiation measure is 5,768 $W/m^2K^4$. The radiation measure for enamelled surfaces that are used as standard coating in oven cavities are of the range 5.3 $W/m^2K^4$, while that of aluminium is 0.22 $W/m^2K^4$. This circumstance has also been the reason why, throughout the past 60 years, enamel has been the preferred coating in oven cavities combined with the ability of that surface to also ensure the oven cavity against corrosion.

Moreover, the coating on the aluminium foil must not have toxic or hazardous properties and it should also be thermally stable up to 300° C., be thin below 14 microns and exhibit sufficient mechanical properties in the application situation. What is intended by this is the usual way in which alu-foil is handled in an in-use situation.

Moreover, the coating is designed in such a manner that the wavelengths from the radiation-emitting surface (the oven wall) and the radiation-absorbing surface (the foil) match.

This means that the wavelength spectrum of the electromagnetic radiation of the one surface is attuned to that of the other surface, whereby the oven surface is able to transmit the radiant heat efficiently to the foil.

The advantage thus obtained is that of using a material with an electromagnetic wavelength spectrum that is comprised, e.g., within the lower half of an interval along with another material with an electromagnetic wavelength spectrum that is within, e.g., the upper half of the interval in order to thereby accomplish a surface on the foil that has an electromagnetic wavelength spectrum that uses all of this interval to advantage.

Moreover, the surface of the foil may be provided with a top coat that reduces the reflection of IR radiation heat from the aluminium surface and at the same time allows the IR radiation to pass. Tests have shown that the utilisation of such duplex coatings provides surprising measurement results that have given better values than the well-known "carbon black" surface mentioned above.

Hereby a distinctly more efficient heat transmission is obtained which, in this context, enables shorter preparation time and/or energy savings since the cooking temperature can be reduced.

The object of the invention can be accomplished by a heat transmission system based on electromagnetic radiation, which heat transmission system comprises an oven cavity and a foil with at least two layers, wherein the at least two layers of the foil comprise a radiation-absorbing layer, wherein the wavelength spectrum of the electromagnetic radiation of the radiation-absorbing layer and the wavelength spectrum of the electromagnetic radiation of the oven cavity are attuned to each other.

This is achieved by having an electromagnetic wavelength spectrum that is a combination of the electromagnetic wavelength spectrum for each of the at least two layers of the foil, providing an internal reflection between the two layers being a top layer and a bottom layer.

The object of the invention is further accomplished by a foil for use in a heat transmission system wherein the foil comprises at least two layers, wherein the wavelength spectrum of the electromagnetic radiation of the foil is attuned to that of a heat source, e.g., the wavelength spectrum of the electromagnetic radiation of an oven.

According to one embodiment the foil is provided with a radiation-absorbing surface that may be configured both as a flexible foil and as an inflexible foil which is made of either metal or of a polymer, paper, cardboard or other materials that are based on wood.

According to a further embodiment the foil has a radiation-absorbing surface with a ductility of at least 5%.

Hereby it is accomplished that the surface is flexible, has high temperature resistance and stability, which enables heating to 300° C. for at least three hours without the material properties deteriorating significantly.

According to a further embodiment, the foil has a radiation-absorbing surface that may be applied either as a coherent film onto the surface or as a partial film.

According to a further embodiment the foil has a radiation-absorbing surface applied with a coating consisting of a temperature-resistant, organic matrix.

According to yet an embodiment of the foil, the coating is applied as a duplex coating, wherein the top layer is whitish to pale grey opalescent.

According to yet an embodiment of the foil, the top layer is $TiO_2$.

According to yet an embodiment, the foil comprises a radiation transmitting surface consisting preferably of minerals that are white or colourless with high emissivity, eg $CaSO_4$, $MgCO_3$, $SiO_2$ or $TiO_2$.

According to yet an embodiment, the radiation-absorbing surface of the foil consists of dark minerals.

According to yet an embodiment of the foil the radiation-absorbing surface can by applied by rotogravure, flexo printing or other corresponding printing technologies.

According to yet an embodiment of the foil, the coating can be applied in part with another coating with a view to providing a decorative application.

According to yet an embodiment of the foil, the radiation-transmitting surface can be chosen such that it reduces reflecting radiation from the subjacent, radiation-absorbing layer.

According to yet an embodiment of the foil, the radiation-transmitting surface comprises $TiO_2$ or aluminium flakes.

According to yet an embodiment of the foil, the radiation-absorbing layer has a wavelength spectre of electromagnetic radiation that is within the interval of 2,500-10,000 nanometres.

According to an embodiment of the foil, the radiation-absorbing layer has a wavelength spectre of electromagnetic radiation that is within the interval of 8,000-10,000 nanometres.

FIG. 2 shows the IR spectrum given for quarts/enamel ($SiO_2$) compared to the spectrum of an ideal black body. From the figure it will appear that the matching is modest. To obtain matching surfaces there has to be correspondence between the wavelength spectrums of the electromagnetic radiation for both the surface of the oven cavity and the coated surface of the alu-foil.

In case of single-layer coatings, a large number of materials were tested. In FIG. 2, selected single-layer coatings are compared to "carbon black" in an experiment where the oven wall had been heated to 400° C. The accomplished temperature at equilibrium is, in case of coatings having a thickness of 6 microns, measured to be 216° C. on "carbon black" and 154° C. on $TiO_2$. For comparison, the temperature was measured to be about 100° C. on aluminium foil. The effect of applying Al flakes onto the Al foil is due to internal reflection of photons between aluminium foil and the underside of the immobilised flakes. It is also noteworthy that a surface coating of a mixture of "carbon black" and $SiO_2$ is more efficient than "carbon black". This shows that the wave lengths are matched in the latter instance compared to the example featuring pure carbon black.

FIG. 3 shows an example of observed maximal temperatures and associated times in performed tests of samples with a one-layer coating of 6 microns. The difference in rise in temperature between coated and non-coated foil is given in the table. The elevated temperature for Al flakes is noticeable, but due to internal reflection of photons between aluminium foil and the underside of the immobilised Al flakes.

Duplex systems have surprisingly shown far more efficient heat transmission properties. The reason for this is to be found in the so-called internal reflection between the bottom layer and the top layer. By combining optimally matching coatings with a top layer that improves the internal reflection, temperatures have thus been measured that are higher than those of single-layer "carbon black" on aluminium foil.

By using a duplex system with "carbon black" as bottom layer and TiO$_2$ as top layer, it is thus possible to combine the good absorbing property of carbon black with the appearance of TiO$_2$. Besides, the absorbing property of the IR radiation is also improved since the total internal reflection within the sample, between bottom layer and top layer, is improved due to the high refraction index of TiO$_2$.

FIG. 4 sets forth observed maximal temperatures and associated times in performed tests of samples with two layers. Shifting in temperature and time between alu-foil and sample and the temperature ratio thereof will also appear from the table. From the table it appears that "carbon black" with and without SiO$_2$ in the bottom layer combined with TiO$_2$ in the top layer exhibits the highest temperatures, measured to be at 232° C. which is 124° C. higher than the surface temperature of the non-treated foil.

The experiments made thus show, see FIG. 4, that $T_{carbon\ black\text{-}TiO2,\ max}$ is more than 16° C. higher than $T_{carbon\ black,\ max}$. It is thus possible to combine the IR absorbing properties of "carbon black" with a high refraction index of TiO$_2$.

FIG. 5 shows the rate of temperature increase and the achieved maximum temperature for selected duplex coatings, with carbon black, carbon black/SiO$_2$ and carbon black/SiO$_2$ in combination with TiO$_2$ as top coat. The bottom set of curves consisting of three curves shows increase in temperature for non-coated aluminium foil.

In all given examples the surface is coated with the aluminium foil by printing technologies such as rotogravure. Rotogravure enables expedient and cost-effective depositing of the very thin coating, and application of duplex layer is standard technique. Therefore, printing technology is a highly interesting manufacturing method that enables the option of very large production capacity and application of very thin coatings, as thin as 6 microns.

In order for the process to be applicable, customised printing ink must be made that contains pigments that have matching properties with respect to the wavelength from the radiation emitting surface (the oven wall) and the radiation-absorbing surface (the foil). Moreover, an organic binder must be selected that is readily able to resist the achieved temperature; acryl styrene polymer and nitrocellulose being obvious options herein.

BRIEF DESCRIPTION OF THE DRAWINGS

In the following, embodiments of the invention will be described with reference to the drawings, wherein

FIG. 3 shows a table of observed maximum temperatures and associated times in tests made of samples with one-layer coating;

FIG. 4 shows observed maximum temperatures and associated times in tests made of samples with two layers;

DETAILED DESCRIPTION OF THE EMBODIMENTS

Figure 1:
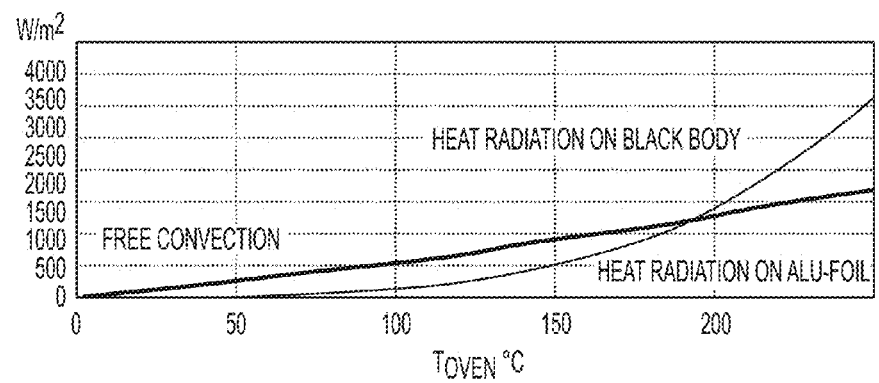
FIG. 1 is a graph showing the heat transmission as a function of the oven temperature. The graphs show the heat transmission by heat radiation divided in accordance with the contributions from free convection, heat convection on black element and heat radiation on alu-foil.

In a heat transmission system according to the invention, an IR-absorbing surface may be structured such that its wavelength is adapted to or matches the IR radiation emitted from a source of heat, e.g., the internal surface of an oven. It thus applies to an oven applied with enamel, which is among the most widely used material for the coating of such oven cavities, that a coating is concerned that emits or radiates IR radiation at the highest intensity, in the range 8,000-10,000 nanometres. In case of the heat transmission system according to the invention, an IR surface is thus adapted to primarily absorb radiation within the same wavelength area, if the heating via radiant heat is to be performed quickly and efficiently. However, it is possible to manufacture a foil that absorbs radiant heat from another wave area than where the oven has its highest radiation intensity, while still accomplishing a heating that is more efficient than if ordinary glossy alu-foil had been used.

When a foil according to the invention is concerned, the applied coating may, in one embodiment, be applied via printing technology and may consist of minerals that are not black, but appear light and visually resemble aluminium. The minerals have the property that they are selected in particular for being able to absorb the IR radiation within the given wavelength that corresponds to the radiation emitted from the hot oven wall. The coating may also be applied as a sandwich layer, wherein a first layer is configured for absorbing the IR radiation and a second layer is configured for reflecting the radiant heat that is emitted from a heated element wrapped in the foil to the effect that the heat from the element is reflected back to the element.

The materials are selected such that they cooperate to enable heat absorption across a wider spectrum than if only one layer was concerned.

Thus, the one material may, e.g., have good absorption of radiant heat within a spectrum from a-b, another material from b-c, and optionally a third material from c-d. Thereby, a material is accomplished that covers good heat absorption within a spectrum from a-d.

In other words, the advantage may be achieved that it is possible to employ a material with an electromagnetic wavelength spectrum that is, e.g., within the lower half of an interval along with another material with an electromagnetic wavelength spectrum that is, e.g., within the upper half of the interval in order to thereby achieve a surface on the foil that has an electromagnetic wavelength spectrum that utilizes all of this interval.

By providing the foil with a layer of aluminium flakes, a so-called internal reflection is obtained between the bottom layer and the top layer. By combining optimally matching coatings with a top layer that improves the internal reflection, higher temperatures have thus been measured on the inner side of the foil compared to what was obtainable via black surfaces (black body).

This means that, in case one uses the foil, e.g., to make baked potatoes, the radiant heat will go through the IR-absorbing layer and heat the potato. When heated, it emits heat which is then reflected from the foil and back towards the potato. The heat effect is thus used more to advantage compared to usual foils.

FIG. 1 shows that, at $T_{oven}$=200° C., radiant heat on a black body will dominate the total heat transmission by about 66%. This is not the case for the radiant heat onto an alu-foil. Here only about 7% of the total heat transmission is due to radiant heat.

Moreover, the foil surface may be provided with a top coat that reduces the reflection of IR radiant heat from the aluminium surface and at the same time allows the IR radiation to pass. The utilisation of such duplex coatings have been found in tests to yield surprising measurement results that have provided improved values over the well-known "carbon black" surface mentioned above.

Hereby a markedly more efficient heat transmission is accomplished which, in this context, enables shorter cooking times and/or energy savings, since the cooking temperature can be reduced.

Figure 2:
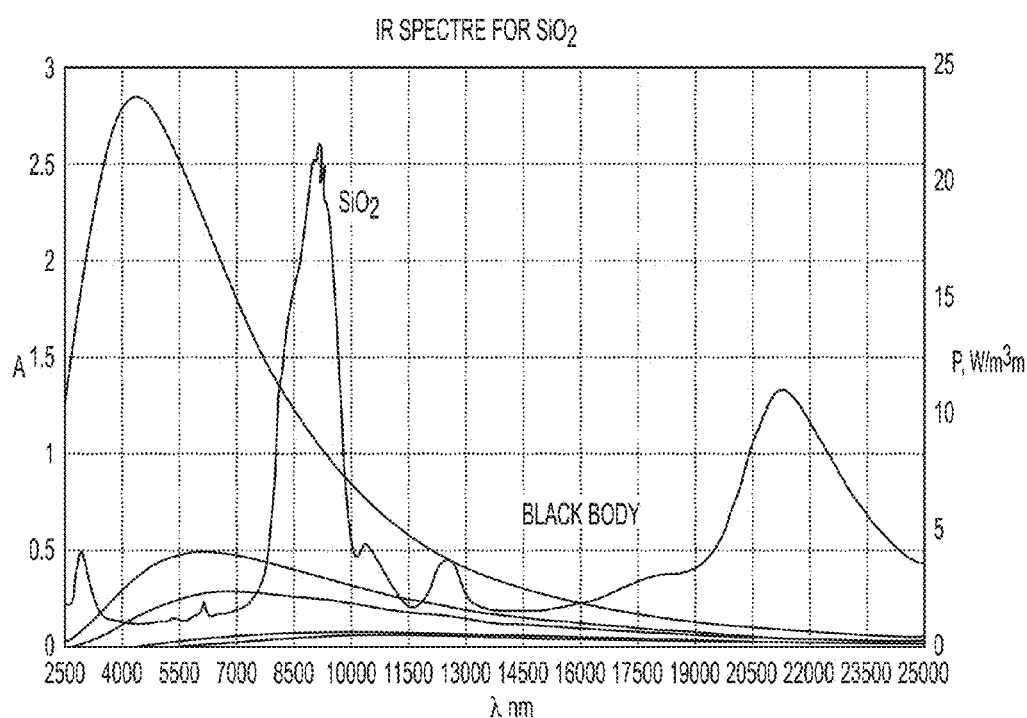
FIG. 2 sets forth the IR spectrum for quartz/enamel (SiO$_2$) compared to the spectrum of an ideal black body.

FIG. 2 shows the IR spectrum set out for quartz/enamel ($SiO_2$) compared to the spectrum of an ideal black body. From the figure it will appear that the matching is modest. To obtain matching surfaces there has to be correspondence between the wavelength spectrums of the electromagnetic radiation for both the surface of the oven cavity and the coated surface of the alu foil.

In case of single-layer coatings, a large number of materials were tested. In FIG. 2, selected single-layer coatings are compared to "carbon black" in an experiment where the oven wall was heated to 400° C. The acquired temperature at equilibrium is, in case of coatings having a thickness of 6 microns, measured to be at 216° C. on "carbon black" and 154° C. on $TiO_2$. For comparison the temperature was measured to be about 100° C. on aluminium foil. The effect deriving from the application of Al flakes onto the Al foil is due to internal reflection of photons between aluminium foil and the underside of the immobilised flakes. It is likewise noteworthy that a surface coating of a mixture of "carbon black" and $SiO_2$ is more efficient than "carbon black". However, once again the observation is a proof of the wavelengths being matched in the latter case compared to the case where pure carbon black was used.

FIG. 3 shows a table of observed maximal temperatures and associated times in tests made of samples with one-layer coating of 6 microns. The difference in temperature increase of tests with coated and non-coated foil is given in the table. The elevated temperature for Al flakes is noteworthy, but due to internal reflection of photons between aluminium foil and the underside of the immobilised Al flakes.

Duplex systems have surprisingly been found to possess far more efficient heat transmission properties. The reason for this is to be found in the so-called internal reflection between the bottom layer and the top layer. By combining optimally matching coatings with a top layer that improves the internal reflection, temperatures have thus been measured that are higher than for single-layer "carbon-black" on aluminium foil.

By using a duplex system with "carbon black" as bottom layer and $TiO_2$ as top layer, it is thus possible to combine the good absorbing property of carbon black with the appearance of $TiO_2$. Moreover, the absorbing property in respect of the IR radiation is improved since the total internal reflection within the sample between bottom layer and top layer is improved due to the high refraction index of $TiO_2$.

FIG. 4 states observed maximal temperatures and associated times in tests made with samples of two-layers. The shifting in temperature and time between alu-foil and sample and the temperature ratio thereof will also appear from the table. From the table will appear that "carbon black" with and without $SiO_2$ in the bottom layer combined with $TiO_2$ in the top layer exhibits the highest temperatures, measured to be at 232° C. which is 124° C. higher than the surface temperature of the non-treated foil.

The experiments made thus show, see FIG. 4, that $T_{carbon\ black\text{-}TiO_2,\ max}$ is more than 16° C. higher than $T_{carbon\ black,\ max}$. It is thus possible to combine the IR absorbing properties of "carbon black" with a high refraction index of $TiO_2$.

Figure 5:
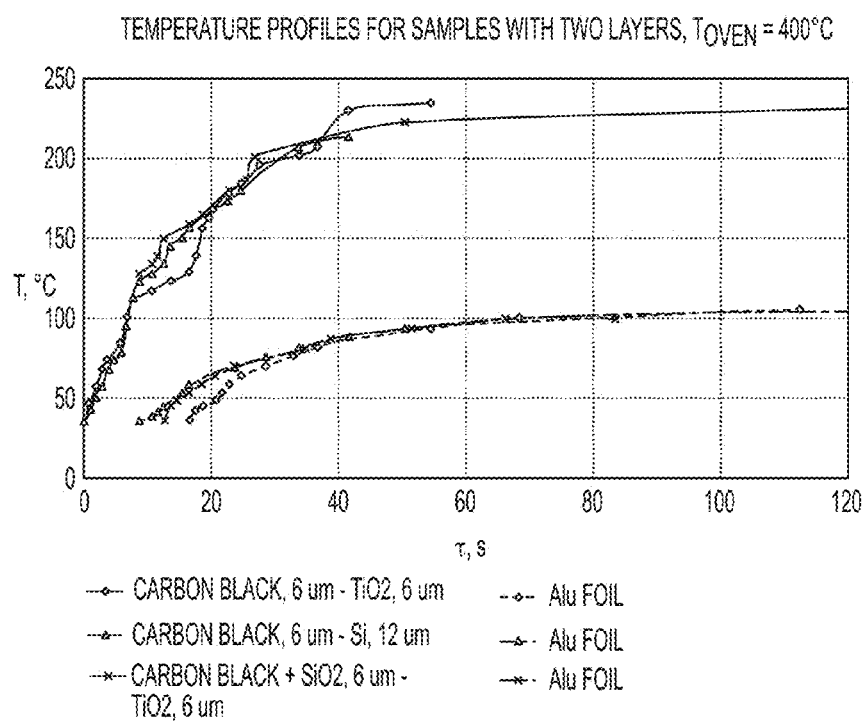
FIG. 5 shows rate of temperature increase and the accomplished maximum temperature for selected duplex coatings.

FIG. 5 shows the rate of temperature increase and the achieved maximum temperature for selected duplex coatings, with carbon black, carbon black/$SiO_2$ and carbon black/$SiO_2$ in combination with $TiO_2$ as top coat. The bottom set of curves consisting of three curves shows increase in temperature for non-coated aluminium foil.

Figure 6:
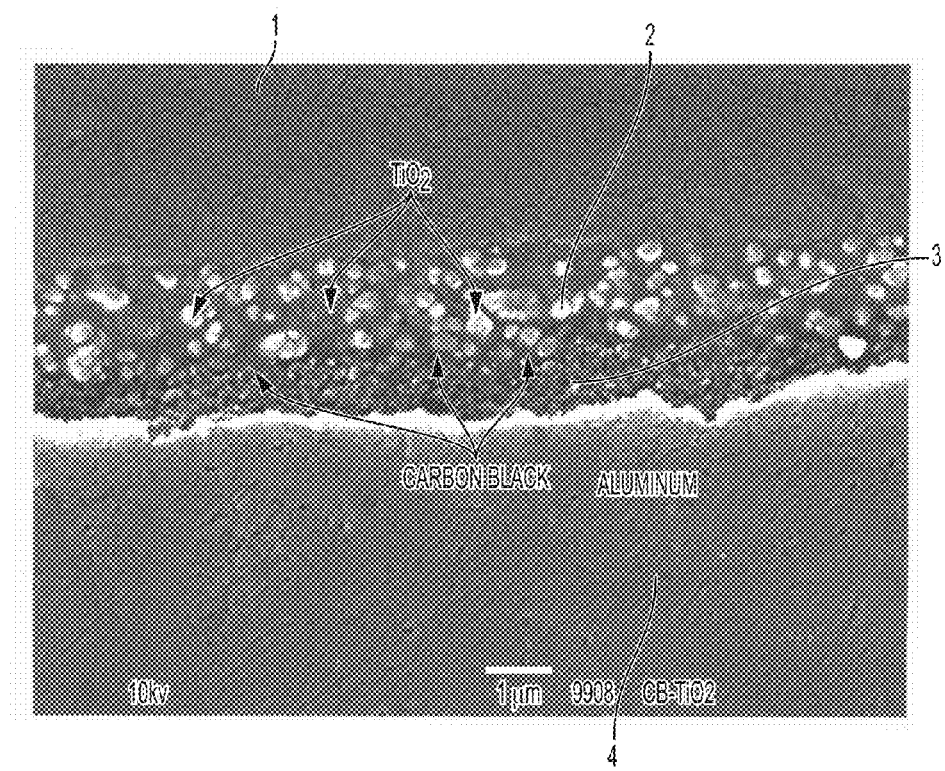
FIG. 6 shows an electron-microscope image of a duplex coating with a "carbon black" film most proximate the aluminium foil followed by a TiO$_2$ coating as top coat.

FIG. 6 shows an image from an electron microscope. The image shows an embodiment of a duplex coating as described in the context of FIG. 4. The coating consists, most proximate to the aluminium foil 4, of a carbon black film 3, followed by a $TiO_2$ coating 2 as top coat. At the top of the figure, a moulding compound 1 is shown. The coating was applied via printing technology. The coating appears white and exhibits a temperature at equilibrium of 232° C. Foils of this type may achieve half the cooking time of a medium-sized baking potato.

Figure 7:
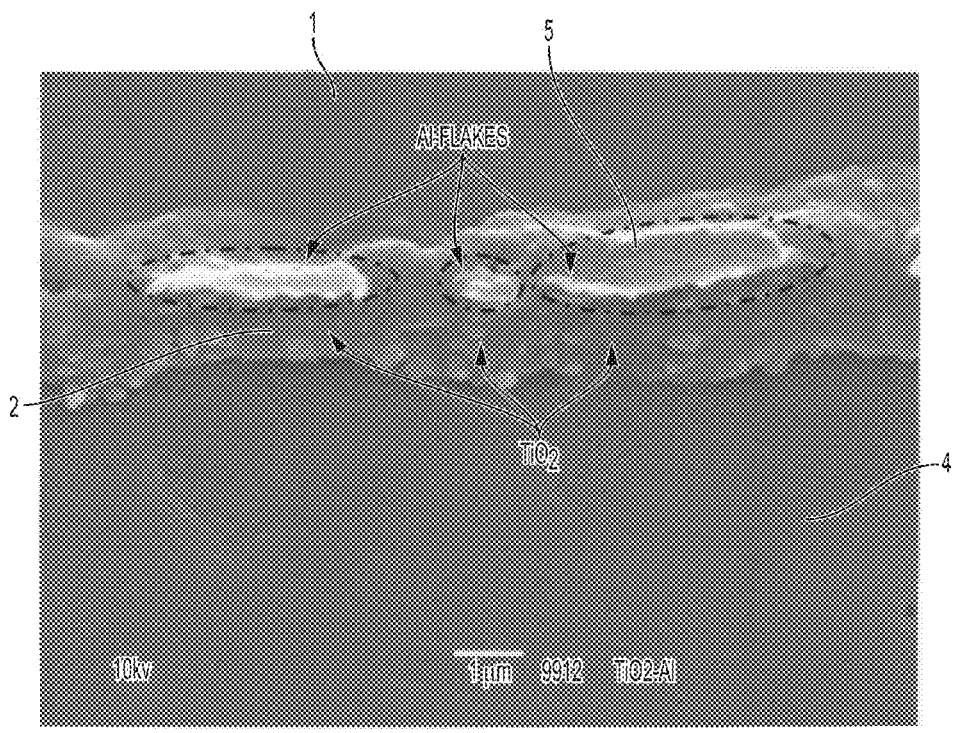
FIG. 7 shows an electron-microscope image of a duplex coating with a TiO$_2$ coating most proximate the aluminium foil followed by aluminium flakes as a top coat.
Figure 8:
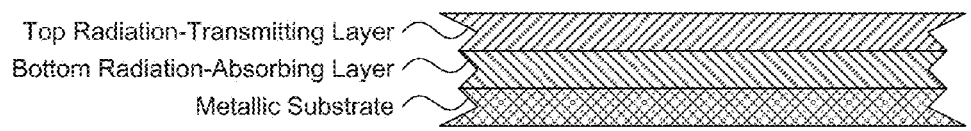
FIG. 8 depicts a cross-section of aluminum foil according to an embodiment of the invention.
Figure 9:
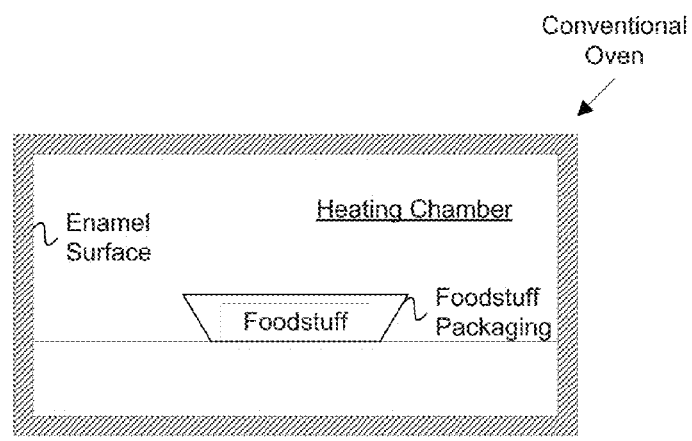
FIG. 9 depicts a cross-section of a heat transmission system based electromagnetic radiation according to an embodiment of the invention.

FIG. 7 shows an image from an electron microscope. The image shows another embodiment of a duplex coating as described above in the context of FIG. 4. Here, the coating consists of a $TiO_2$ coating 2 most proximate the aluminium foil 4, followed by the earlier mentioned aluminium flakes 5 as top coat (aluminium flakes are shown in the dashed ellipses). At the top of the figure, the moulding compound 1 is seen. The coating is applied via printing technology. This coating achieves a temperature of 199° C. during test run, whereas a pure $TiO_2$ coating does not achieve a temperature above 154° C.

For comparison the non-treated foil does not reach 100° C. in the same treatment.

In all of the given examples, the surface is applied with the aluminium foil via printing technologies, such as rotogravure. Rotogravure enables expedient and cost-effective depositing of the very thin coating, and application of duplex layer is standard technique. Therefore, printing technology is a highly interesting manufacturing method that enables the option of very large production capacity and application of very thin coatings, as thin as 6 microns.

In order for the process to be applicable, customised printing ink must be made that contains pigments that have matching properties with respect to the wavelength from the radiation emitting surface (the oven wall) and the radiation-absorbing surface (the foil). Moreover, an organic binder must be selected that is readily able to resist the achieved temperature; acryl styrene polymer and nitrocellulose being obvious options herein.

According to a further embodiment the radiation-absorbing surface may have a whitish to pale grey opalescent appearance.

The invention claimed is:

1. A heat transmission system based on electromagnetic radiation, which heat transmission system comprises:
    a conventional oven having a heating chamber defined by internal enamel surfaces, and
    a foodstuff packaging in said heating chamber and comprising a foil formed of:

a metallic substrate;
a bottom layer on said metallic substrate; and
a top layer on said bottom layer, each of said bottom and top layers having an electromagnetic wavelength spectrum so as to provide an internal reflection therebetween, the top layer exhibiting a wavelength spectrum of an electromagnetic radiation between 2,500-10,000 nanometers.

2. The heat transmission system according to claim 1, wherein the metallic substrate of said foil comprises aluminum, said bottom layer comprises carbon black, and said top layer comprises $TiO_2$.

3. The heat transmission system according to claim 1, wherein the metallic substrate of said foil comprises aluminum, said bottom layer comprises $TiO_2$, and said top layer comprises aluminum flakes.

4. Aluminum foil consisting of:
a metallic substrate comprising aluminum,
a bottom radiation-absorbing layer on said metallic substrate, and
a top radiation-transmitting layer on said bottom layer, each of said bottom and top layers having an electromagnetic wavelength spectrum so as to provide an internal reflection therebetween, the top layer exhibiting a wavelength spectrum of an electromagnetic radiation between 2,500-10,000 nanometers.

5. The foil according to claim 2, wherein said bottom layer is either flexible or inflexible.

6. The foil according to claim 5, wherein the bottom layer has a ductility of at least 5%.

7. The foil according to claim 5, wherein the bottom layer is applied to the substrate as either a coherent film or as a partial film.

8. The foil according to claim 5, wherein the bottom layer is applied to the substrate as a temperature resistant organic matrix.

9. The foil according to claim 8, wherein said top layer consists of minerals that are white or colourless with high emissivity.

10. The foil according to claim 9, wherein the top layer reduces reflected radiation from the subjacent bottom layer.

11. The foil according to claim 10, wherein the top layer comprises $TiO_2$ or aluminum flakes.

12. The foil according to claim 8, wherein the bottom and top layers are applied to the substrate as a duplex coating, and where the top layer is whitish to pale grey opalescent.

13. The foil according to claim 12, wherein the top layer comprises $TiO_2$.

14. The foil according to claim 12, wherein the bottom layer consists of dark minerals.

15. The foil according to claim 12, wherein the bottom layer is applied to the substrate by rotogravure, flexo printing or corresponding printing technologies.

16. The foil according to claim 4, wherein the top layer exhibits an electromagnetic wavelength spectrum between 8,000-10,000 nanometres.

17. The foil according to claim 4, wherein said metallic substrate consists of aluminum.

18. The foil according to claim 17, wherein said bottom radiation-absorbing layer comprises carbon black and said top radiation-transmitting layer comprises $TiO_2$.

19. The foil according to claim 17, wherein said bottom radiation-absorbing layer comprises $TiO_2$ and said top radiation-transmitting layer comprises aluminum flakes.

20. The foil according to claim 4, wherein said top layer comprises $CaSO_4$, $MgCO_3$ or $SiO_2$.

* * * * *